US011311957B2

(12) United States Patent
Clark et al.

(10) Patent No.: US 11,311,957 B2
(45) Date of Patent: Apr. 26, 2022

(54) APPLYING A CLADDING LAYER TO A SURFACE OF A COMPONENT USING A CLADDING TOOL HAVING A MAXIMUM REACH LESS THAN THE SIZE OF THE SURFACE

(71) Applicants: ROLLS-ROYCE PLC, London (GB); ROLLS-ROYCE POWER ENGINEERING PLC, Derby (GB)

(72) Inventors: Daniel Clark, Belper (GB); Sebastiano D Giudice, Market Harborough (GB)

(73) Assignees: ROLLS-ROYCE plc, London (GB); ROLLS-ROYCE POWER ENGINEERING PLC, Derby (GB)

( * ) Notice: Subject to any disclaimer, the term of this patent is extended or adjusted under 35 U.S.C. 154(b) by 601 days.

(21) Appl. No.: 16/291,156

(22) Filed: Mar. 4, 2019

(65) Prior Publication Data
US 2019/0283166 A1 Sep. 19, 2019

(30) Foreign Application Priority Data

Mar. 16, 2018 (GB) ........................ 1804215

(51) Int. Cl.
G05B 99/00 (2006.01)
B23K 9/095 (2006.01)
(Continued)

(52) U.S. Cl.
CPC .......... *B23K 9/0953* (2013.01); *B23K 9/0043* (2013.01); *B23K 9/16* (2013.01);
(Continued)

(58) Field of Classification Search
CPC ........................... G05B 2219/45138
(Continued)

(56) References Cited

U.S. PATENT DOCUMENTS 4,266,110 A * 5/1981 Barger ................. B23K 9/324
219/73.21
2006/0090336 A1 5/2006 Graham et al.
(Continued)

FOREIGN PATENT DOCUMENTS

| CN | 105234553 A | 1/2016 |
| CN | 106041258 A | 10/2016 |

(Continued)

OTHER PUBLICATIONS

Jul. 18, 2019 Search Report issued in European Patent Application No. 19160696.1.
(Continued)

*Primary Examiner* — Suresh Suryawanshi
(74) *Attorney, Agent, or Firm* — Oliff PLC

(57) ABSTRACT

A method and apparatus for applying a cladding layer to a surface of a component uses a cladding tool having a maximum reach less than the size of the surface. Geometry of the surface is segmented into a plurality of tessellated segments, each of which has a peripheral extent determined by a maximum reach of the cladding tool. A nominal tool subpath for each tessellated segment is generated, and then combined to generate a nominal tool path for depositing the cladding layer on the surface. The surface is clad using the nominal toolpath, including a process of adjusting the nominal tool path to an adjusted tool path that accounts for dimensions of the bead to be deposited by the tool to match an edge of the bead to be deposited with an edge of a previously deposited bead.

20 Claims, 8 Drawing Sheets

(51) Int. Cl.

| | |
|---|---|
| *B23K 26/082* | (2014.01) |
| *B23K 9/00* | (2006.01) |
| *B23K 9/16* | (2006.01) |
| *B23K 9/167* | (2006.01) |
| *B23K 9/23* | (2006.01) |
| *B23K 37/02* | (2006.01) |
| *B23K 37/04* | (2006.01) |
| *F17C 1/10* | (2006.01) |
| *B23K 26/03* | (2006.01) |
| *B33Y 50/02* | (2015.01) |
| *B23K 103/18* | (2006.01) |
| *B23K 101/34* | (2006.01) |

(52) U.S. Cl.
CPC .............. *B23K 9/167* (2013.01); *B23K 9/232* (2013.01); *B23K 26/032* (2013.01); *B23K 26/082* (2015.10); *B23K 37/027* (2013.01); *B23K 37/04* (2013.01); *B33Y 50/02* (2014.12); *F17C 1/10* (2013.01); *B23K 2101/34* (2018.08); *B23K 2103/18* (2018.08); *B23K 2103/26* (2018.08); *F17C 2203/0607* (2013.01); *F17C 2209/221* (2013.01); *F17C 2260/053* (2013.01)

(58) Field of Classification Search
USPC ........................................................ 700/212
See application file for complete search history.

(56) References Cited

U.S. PATENT DOCUMENTS

| | | |
|---|---|---|
| 2012/0305532 A1 | 12/2012 | Harris |
| 2016/0356595 A1 | 12/2016 | Lessmueller et al. |
| 2016/0361775 A1* | 12/2016 | Collis ...................... B23K 9/23 |
| 2018/0050418 A1* | 2/2018 | Dong ...................... B33Y 70/00 |

FOREIGN PATENT DOCUMENTS

| | | |
|---|---|---|
| WO | 03/042895 A1 | 5/2003 |
| WO | 2010/091086 A1 | 8/2010 |
| WO | 2014/042970 A1 | 3/2014 |
| WO | 2016/090903 A1 | 6/2016 |

OTHER PUBLICATIONS

May 9, 2018 Search Report issued in British Patent Application No. 1804215.0.

M. Bertoldi et al. "Domain Decomposition and Space Filling Curves in Toolpath Planning and Generation". pp. 267-276.

Jason Jones et al. "Remanufacture of Turbine Blades by Laser Cladding, Machining and In-Process Scanning in a Single Machine".

Radu Pavel. "Adaptive Machining for High Precision Fabrication". Optis Solutions, pp. 1-35.

"Adaptive Laser Sensor". URL:<http://cloosrobot.com/products/accessories-sensors-software/adaptive-laser-sensor/>.

* cited by examiner

APPLYING A CLADDING LAYER TO A SURFACE OF A COMPONENT USING A CLADDING TOOL HAVING A MAXIMUM REACH LESS THAN THE SIZE OF THE SURFACE

TECHNICAL FIELD

The present disclosure concerns a method and apparatus for applying a cladding layer to a surface of a component.

BACKGROUND

Pressure vessels, especially larger vessels, typically require an internal corrosion resistant layer to reduce the risk of stress corrosion cracking, pitting, and the formation of debris that could travel through the vessel and into any connected components. Such corrosion resistant layers are usually referred to as "cladding," and typically consist of a stainless steel or nickel based alloy. The cladding is usually applied to the parent material of the pressure vessel with a welding method, such as Submerged Arc Strip Cladding (SASC), submerged arc welding with a wire, manual metal arc welding, or other welding methods such as Tungsten Inert Gas (TIG) welding or Metal Active Gas welding (MAG). It is also known to clad vessels using explosion welding. Such processes involve the application of strips of cladding material to the surface of a substrate to provide a continuous weld path that ultimately provides a continuous layer of cladding over the parent material.

A problem may be encountered in generating an optimum weld path due to the size and geometry of such vessels. This is because the maximum reach of the cladding tool is substantially less than the size of the surface to be clad. Furthermore, the geometry of the part will tend to differ from a nominal designed geometry due to inconsistencies in material condition and manufacturing variability. This is particularly applicable when applying a cladding layer to a non-planar part such as a curved or domed section such as on a large pressure vessel. Various surface features such as crotch corners or saddle shapes can also result in problems when attempting to apply a uniform cladding layer. The effect of this is that, if a pre-determined weld path is applied while assuming only the nominal dimensions of the part, inherent manufacturing variations could result in missed areas, or overlaps, which will lead to subsequent manual intervention and re-work being necessary.

SUMMARY

In a first aspect there is provided a method of applying a cladding layer to a surface of a component using a cladding tool having a maximum reach less than the size of the surface, the method comprising:

providing a 3-dimensional model of the component, the model including geometry of the surface to be clad;

generating a point distribution from the geometry of the surface, the point distribution including a plurality of points having a separation determined by a maximum reach of the cladding tool;

generating a plurality of tessellated segments from the point distribution, each tessellated segment having a peripheral extent determined by a maximum reach of the cladding tool;

generating a nominal tool subpath for each one of the plurality of tessellated segments;

generating a nominal tool path for depositing the cladding layer on the surface of the component by combining the nominal tool subpaths;

positioning a the cladding tool adjacent a the surface of the component, the tool being configured to deposit the cladding layer as a bead applied to the surface of the component;

depositing the cladding layer on the surface of the component by instructing cladding the tool to move along the nominal tool path;

measuring dimensions of a bead of cladding layer previously deposited by the tool;

adjusting the nominal tool path to an adjusted tool path that accounts for dimensions of the bead to be deposited by the tool to match an edge of the bead to be deposited with an edge of a previously deposited bead; and continuing to deposit the cladding layer on the surface of the component by instructing the tool to move along the adjusted tool path.

In another aspect there is provided a non-transitory computer-readable medium having instructions encoded thereon executable by a computer that, when executed by the computer, causes the computer to perform the aforesaid method.

According to a another aspect there is provided an apparatus for applying a cladding layer to a surface of a component using a cladding tool having a maximum reach less than the size of the surface, the apparatus comprising:

a computer storing a 3-dimensional computer model of the component, including geometry of the surface to be clad; and a cladding tool configured to deposit the cladding layer as a bead applied to a surface of the component, wherein the computer is configured to:

generate a point distribution from the geometry of the surface, the point distribution including a plurality of points having a separation determined by a maximum reach of the cladding tool;

generate a plurality of tessellated segments from the point distribution, each tessellated segment having a peripheral extent determined by a maximum reach of the cladding tool;

generate a nominal tool subpath for each one of the plurality of tessellated segments;

generate a nominal tool path for depositing the cladding layer on the surface of the component by combining the nominal tool subpaths;

instruct the cladding tool to deposit the cladding layer on the surface of the component by instructing the tool to move along the nominal tool path while applying the cladding layer bead;

measure dimensions of a cladding layer bead previously deposited by the tool;

adjust the nominal tool path to an adjusted tool path that accounts for dimensions of the bead to be deposited by the tool to match an edge of the bead to be deposited with an edge of a previously deposited bead; and continue to instruct the tool to deposit the cladding layer on the surface of the component by instructing the tool to move along the adjusted tool path.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
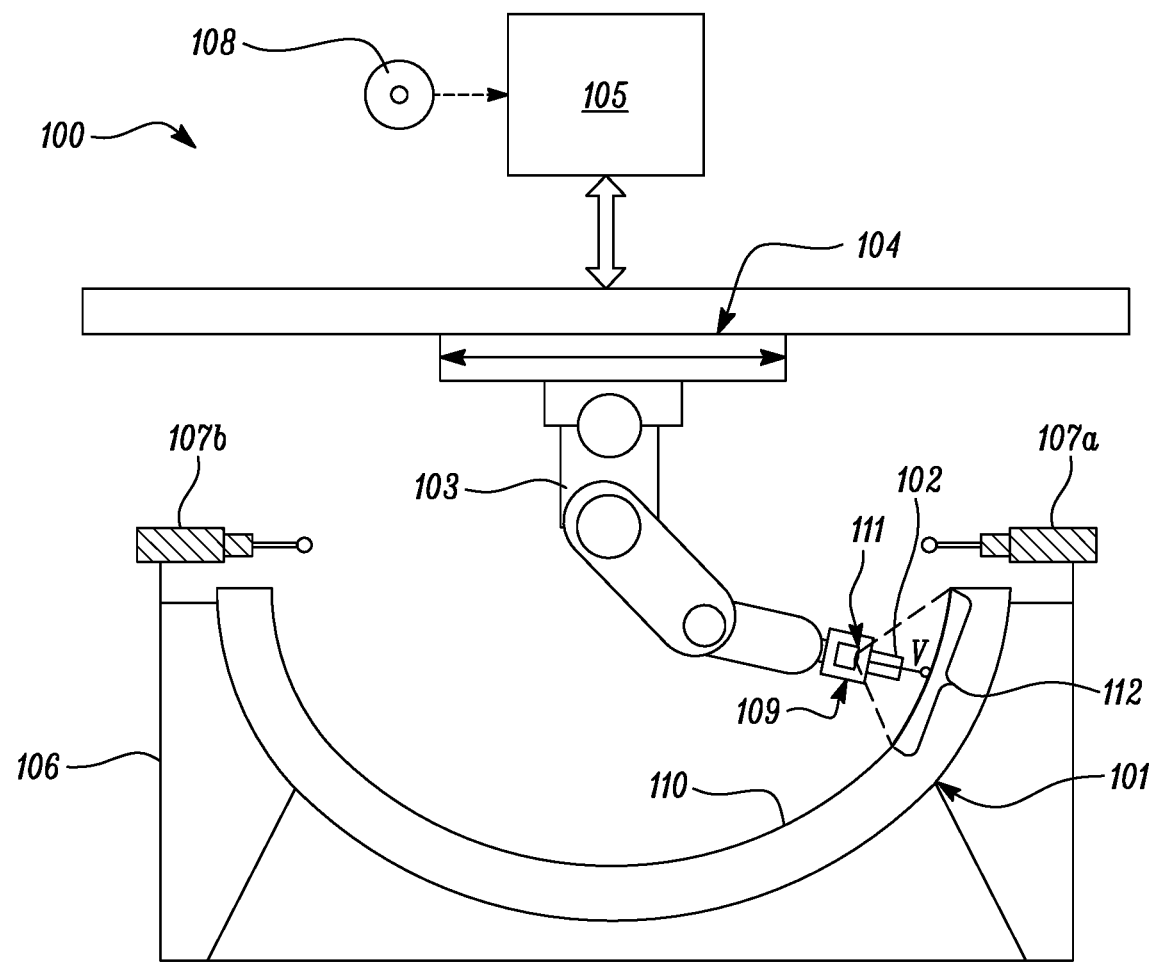
FIG. 1 is a schematic diagram of an apparatus for applying a cladding layer to an article.

An example system 100 for applying a cladding layer to a component 101 to be clad is illustrated schematically in FIG. 1. The system 100 comprises a cladding tool 102, which is provided with a heat source and a supply of filler material, together with any other consumables such as fluxes. For example, the heat source might be a laser, although it will be appreciated that another heat source could be used, such as a plasma weld unit. Alternatively, the heat source may be a TIG weld unit, such as a twin cathode TIG weld unit. The consumable may be filler-in-wire, powder, powder-in-wire, metal tape, or any other suitable consumable appropriate for the heat source. In the case of filler-in-wire, pre-heating of the consumable may be performed prior to the cladding operation. In the present example, the cladding tool 102 is mounted to a robotic manipulator arm 103, which allows the tool 102 to be moved over the component 101 to be clad. The robotic manipulator arm 103 is mounted to a gantry 104 to allow the arm 103 to be moved on a large scale, whereas fine scale movement is achieved by manipulating the arm 103 while the gantry 109 remains fixed.

The maximum reach of the cladding tool 102 is less than the size of the surface of the component 101 to be clad. In the present example, the component is a large (typically 1 to 5 metres in diameter) domed end for a pressure vessel.

The cladding tool 102 and, in this example, the arm 103 and gantry 104, are controlled by a computer system 105. In the example of FIG. 1, the component 101 is mounted to a fixture 106. The fixture 106 could be static or could be arranged to move relative to the robotic manipulator arm 103 to change the location of the cladding material being deposited. The fixture 106 comprises one or more reference points to enable the tool 102 to be accurately positioned relative to the component 101. These reference points may be provided by datum surfaces, touch trigger probes, retro-reflectors or other means for determining a fixed position on the component 101. In the illustrated example in FIG. 1, two touch trigger probes 107a, 107b are provided at opposing sides of the component 101 to be clad, The touch trigger probes 107a, 107b allow the tool 102 to be located relative to either side of the component 101.

As will be described in further detail, the computer system 105 executes computer-readable instructions, possibly obtained from a computer-readable medium such as a CD-ROM 108 or via download from a network (not shown). The computer-readable instructions allow the computer system 105 to control the tool 102 to clad the component.

In particular, to control movement of the tool 102, a 3-dimensional computer model of the component 101, comprising at least the surface 112 to be clad, is created either at runtime by the computer system 105 or in an earlier separate procedure. This may be achieved using metrology equipment to scan the component 101 and create a 3-dimensional virtual model. Commercially available equipment such as the ATOS industrial scanning systems from GOM GmbH of Braunschweig, Germany may be used for this purpose.

A non-contact measurement instrument 109 having a field of view 110 in front of and behind the cladding tool 102 may be incorporated. The instrument 109 may project a laser beam via a lens 111 on to the surface 112 of the component 101, for example in the form of a laser line or a grid. Optical instruments, such as a camera, may be used to capture images of the projected laser lines. These images may be used to extract geometrical information such as the shape and dimensions of the cladding bead being deposited.

Based on the computer model of the component 101, a default or nominal tool path may be defined that would, in ideal circumstances, result in a uniform thickness of cladding being applied over the surface 112 of the component 101. Such a nominal tool path would, however, only result in a uniform cladding layer if the dimensions of the component 101 and dimensions of the weld bead used to form the cladding layer exactly matched the design dimensions. In practice, variation from both is to be expected. The nominal tool path is therefore allowed to deviate in accordance with measurements taken during deposition of the cladding layer.

Figure 2:
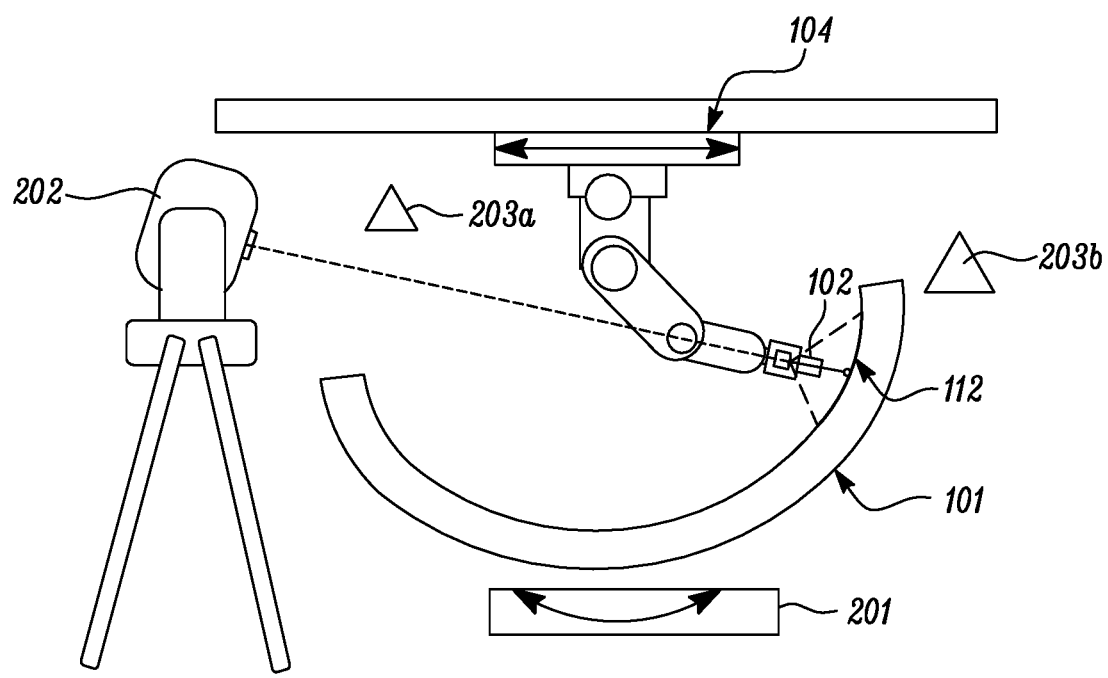
FIG. 2 is a schematic diagram of an apparatus similar to that of FIG. 1, with additional components for positioning the article and for accurately locating the position of a tool relative to the article.

FIG. 2 illustrates a similar arrangement to that shown in FIG. 1, where a component 101 to be clad is positioned relative to a tool 102 on a robotic manipulator arm 103. In this example the component 101 may be moved relative to the arm 103 using a table 201 that allows for rotation and/or tilting of the component 101 relative to the tool 102. In addition, a laser-based tracker 202 is used to measure the position of the tool 102 relative to one or more retroreflectors 203a, 203b, which each provide a fixed reference position. A further retroreflector may be provided on the tool 102 to determine the position of the tool 102. This may be used along with the features shown in FIG. 1 and described above. In use, the laser tracker 202 can be used to track the tool 102 as it scans across the surface 112 of the component 101 and measure a position of the tool 102 that may be more accurate than can be provided by the robotic manipulator arm 103 alone.

Figure 3:
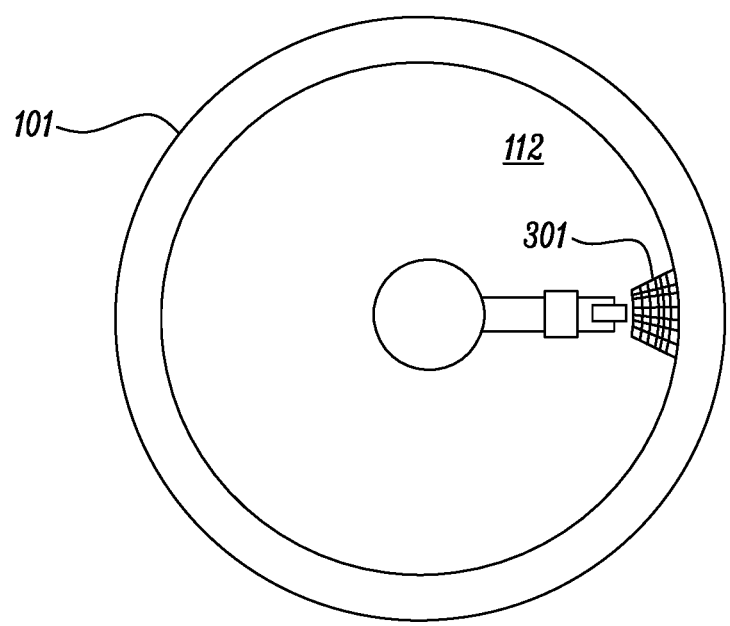
FIG. 3 is a schematic diagram of a weld tool with a typical scan pattern for an internal surface of a domed structure.

FIG. 3 illustrates schematically an example grid pattern 301 projected on to the surface 112 of a component 101 to be clad. This grid pattern 301 may be used to determine local variations in the component surface 101 and in previously applied beads of cladding, as described below in further detail below.

Figure 4A:
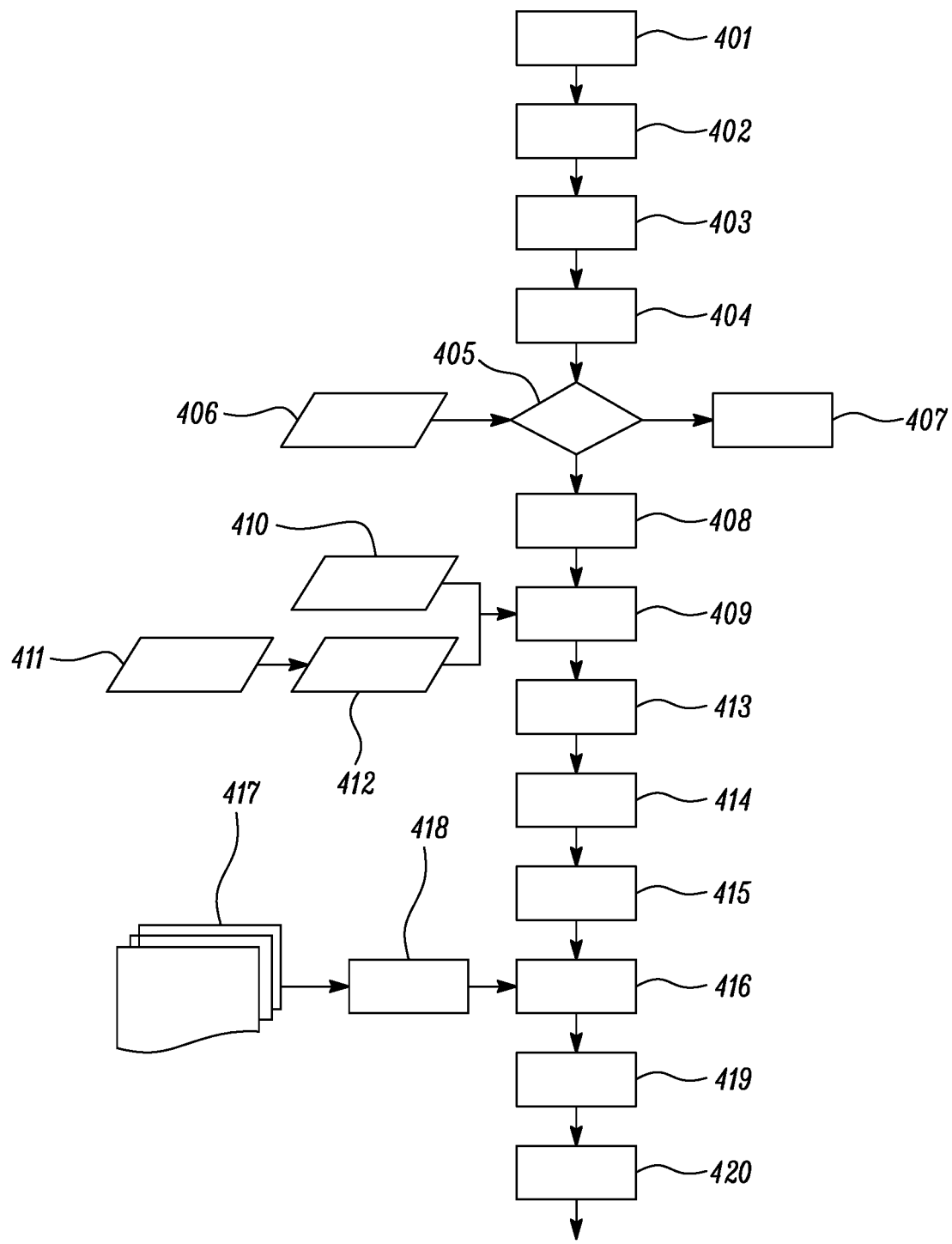
FIGS. 4a and 4b are flow diagrams of an example process for measuring a component, generating a nominal tool path and applying a cladding layer to the component.
Figure 4B:
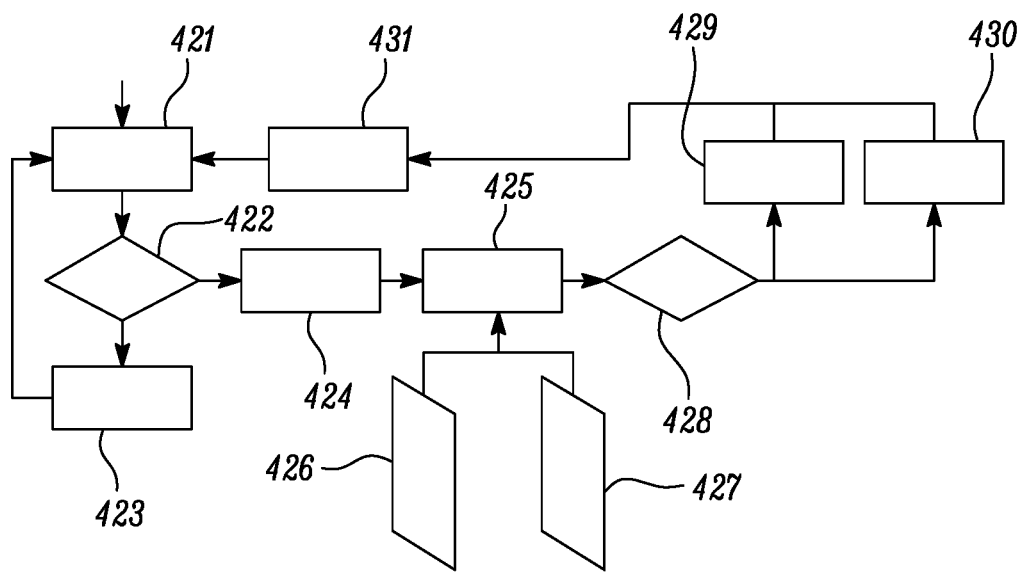

FIGS. 4a and 4b illustrate in flow chart format an example series of operations (which in one aspect may be embodied as computer-executable instructions) for generating a nominal tool path from a computer model of a component to be clad (FIG. 4a) and then cladding the component using the nominal tool path, adjusted according to measurements taken during a cladding operation (FIG. 4b). The operation starts by initiating a scanning operation (step 401) of the component, for example using a three dimensional scanning tool. This generates a point cloud (step 402). The point cloud is then meshed (step 403), creating a three dimensional surface (step 404). The steps of creating the point cloud and mesh may for example be carried out using 3D metrology software such as Polyworks® from InnovMetric Software Inc. (www.innovmetric.com). A check is then made at step 405 to determine whether the component conforms, within specified tolerances, to a nominal component geometry 406. If the component does not conform, a rework step 407 may be required. If the component does conform, a series of steps is then carried out to generate a nominal tool path.

If the component is particularly large, which may be the case for large pressure vessels (typically the order of a few metres in diameter), it is not possible to sufficiently accurately follow a single path across the whole component surface with a tool carried by a robotic arm without having to recalibrate the tool position. Referring to the example arrangement in FIGS. 1 and 2, large scale movements of the arm 103 may be achieved using movement of the mobile gantry 104, while small scale accurate positioning may be achieved using the arm 103. In alternative arrangements, the tool may be mounted to a manipulator on board a mobile tool holder that is able to traverse the component surface 112. The manipulator may for example be a robotic vehicle with more than three legs (three legs being the minimum required for stability, with at least one extra leg to allow for movement), such as a robotic pentapod or hexapod. In each arrangement, the tool 102 will be able to traverse a given area to apply cladding to that area, after which a larger scale movement of the manipulator is required to reposition the tool over another area of the component surface 112. A nominal tool path may be calculated based on these criteria, taking into account the maximum movement allowed while accurately depositing cladding in a single step. To do this, the model of the component surface may be divided up into multiple areas or segments, each of which can be clad without large scale movement of the tool, and preferably in a single cladding pass.

As a first step 408 in generating the nominal tool path, a point distribution is generated to cover the component surface. The point distribution represents the centroid positions projected on to the surface of multiple locations of the tool, with a spacing between the points taking into account the maximum reach of the tool within accuracy limits. The points may therefore have a maximum distance between them of twice the maximum movement of the tool from each centroid position.

Once the point distribution is generated, a segmentation process is performed in which tessellated segments are generated (step 409) that define a peripheral extent around each point. These may be generated automatically using a Voronoi tessellation algorithm 412, with a rule 411 that the maximum radius of each segment is half the maximum reach of the tool, and taking into account parameters of the working volume of the system 410 such as the limits of the mobile gantry. The centroids of each of the segments are then calculated (step 413), and a projected apex of a cone at each centroid is determined (step 414), resulting in a starting position for the tool for each segment. This results in a series of global positions (step 415), which are the fixed positions in space relative to the component that are used to scan the tool over the component surface. Other tessellation algorithms, such as Delauney triangulation, may alternatively be used.

Once the component surface is divided into multiple segments, each of which is able to be clad with a sufficient accuracy, nominal tool subpaths are generated (step 416) so that each segment can be entirely covered with cladding, preferably in a single pass for each segment. To do this, a modified fractal tool trajectory 418 may be used, which takes into account various rules 417. The rules may for example include one or more of the following:

i) the end of a cladding path needs to be on an inbound boundary (i.e. not at an external edge of the component), so that the path can continue over to an adjacent segment after repositioning of the tool to allow for a contiguous cladding path over multiple areas;

ii) the permissible radius of any bends in the path is restricted, for example to no less than 90 degrees unless certain exceptions apply such as a free surface having a high curvature; and iii) when close to an unfilled area, the trajectory may be adjusted by switching to one of a number of possible alternative types of tool path, optionally using an algorithm such as a genetic algorithm to select for an optimised tool path; and iv) optimisation to reduce the number of turns and to promote parallelism.

The trajectory for each area may for example be in the form of a Hilbert space-filling curve or a raster scan or similar.

From each trajectory, a nominal tool path is generated (step 419) by combining the subpaths. In this step, a conversion may take place into in computer numerical control (CNC) code. An additional step 420 may be included to optimise the fill patterns based on set global parameters that aims to minimise cladding turns. The nominal tool path is then ready for cladding to begin.

Referring to FIG. 4b, at step 421, which may follow immediately from step 420 or may be separately initiated once a nominal tool path is determined, the cladding operation is started (or continued). The tool is positioned at a starting point for one of the segments dividing up the component surface and begins to follow the nominal tool path extending over the component surface. An additional initialisation step may include verifying the orientation of the component, for example by checking the position of known features on the component. If the segment being clad is not yet filled, a check for which is carried out at step 422, the cladding process continues (step 424). If the segment is complete, the tool is moved to the next global position (step 423), and the cladding process begins for that segment (step 421), preferably starting from the same position as the end of the path for the previous segment.

As the cladding continues for the segment (step 424), errors between the nominal tool path and a measured path are calculated, which may be determined from continuous measurements taken on the actual position of the tool relative to the component. These errors may be calculated taking into account a rearward non-contact scan 426 of the cladding width and height and a forward non-contact scan 427 of the cladding width and height. The rearward scan 426 is of the cladding that has just been deposited by the tool, while the forward scan 427 is of cladding that may have been deposited in a previous part of the path for the current segment, or a path running along the edge of a previously filled segment. A decision is then made (step 428) as to whether the errors are sufficiently large to take action to adjust the nominal tool path. If, for example, the errors are small, such as a small increase in overlap between adjacent cladding layers, the parameters for the tool to generate the cladding may be adjusted (step 429), for example by adjusting the supply of material (such as a supply of powder or wire) and/or the power input to the tool (such as laser power or electrical power), or by adjusting the travel speed of the tool, any of which may be used to alter the width of the cladding layer being deposited by the tool. If, however, the errors are larger, and beyond the range of such adjustments, an offset may be generated to the nominal tool path (step 430), forming an adjusted tool path that the tool will then follow. This adjusted tool path will then have resulting effects on further sections of the tool path for the current and subsequent areas to be filled.

In an additional optional step 431, if the tool path reaches a portion that cannot be filled using the current parameters for the tool, the path may be adapted to fill the portion using adjusted tool parameters, an example of which is described in more detail below.

Figure 5:
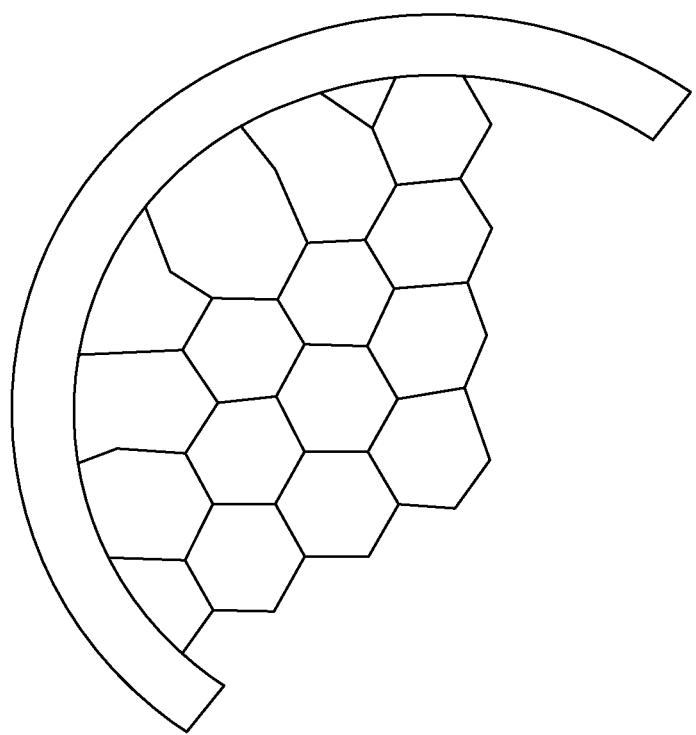
FIG. 5 is a schematic diagram of a part of a component with a surface to be clad divided into segments.

FIG. 5 illustrates schematically the type of segmentation that may result from dividing the surface of a component to be clad into multiple tessellated areas. For a uniformly distributed set of points across a plane, a Voronoi pattern will tend to generate hexagonal shaped areas, with shapes at the edges of the plane being distorted by the requirement to have an edge defined by the edge of the component surface. A curved boundary, with a three dimensionally curved surface, for example the internal surface of a hemisphere, may be covered in approximations to hexagonal and pentagonal shapes, again with distorted shapes at the edges of the surface.

Figure 6:
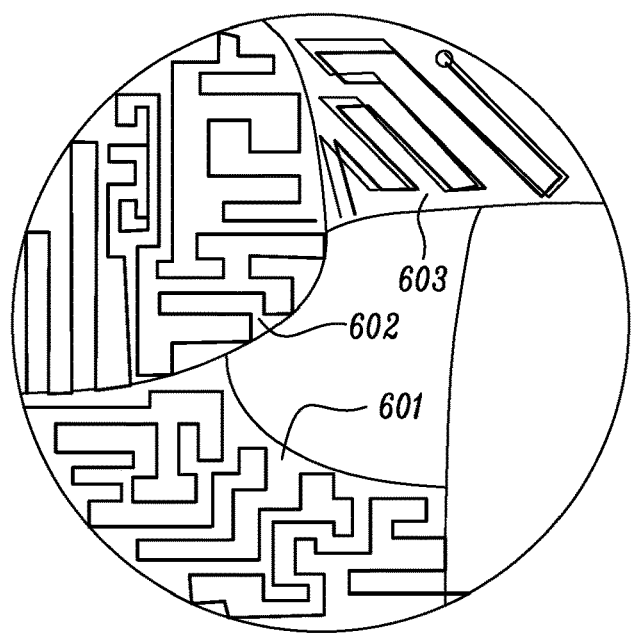
FIG. 6 is a schematic diagram of example nominal tool paths for covering segments of a surface to be clad.

FIG. 6 illustrates schematically how nominal tool paths covering a surface to be clad may be formed. The paths may be generally in two orthogonal directions, as in the first and second areas 601, 602, or in some cases may have an adjusted direction, as in a third area 603, depending on the orientation of the tool for that area or the particular shape of the area itself.

Figure 7:
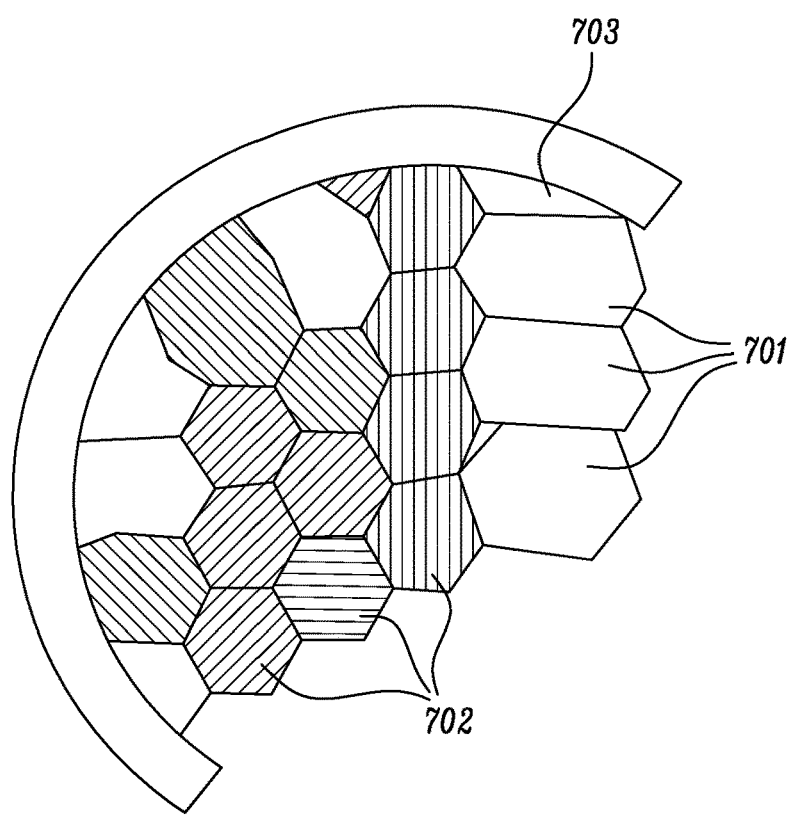
FIG. 7 is a schematic diagram illustrating different tool paths for different segments on a surface to be clad.

FIG. 7 illustrates schematically a component surface during the process of cladding, with some segments 701 having been clad. Other segments 702 have yet to be clad, and have nominal tool subpaths generated that define straight paths to fill each segment optimally. Other segments 703 may be too small to be filled using the same nominal tool subpaths, and alternative tool subpaths and tool parameters may be used instead.

Figure 8:
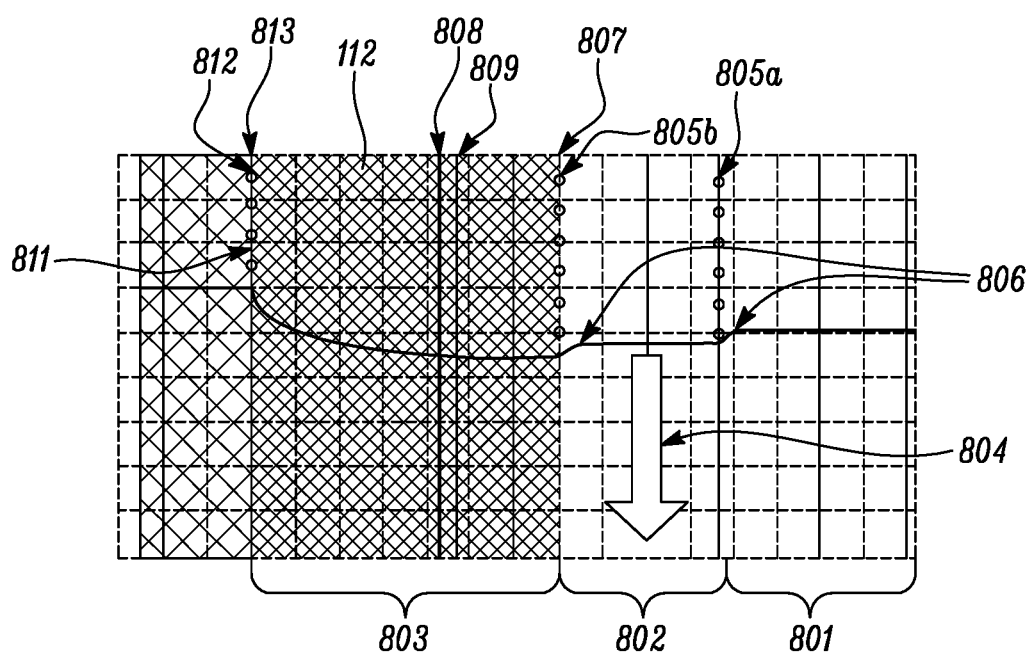
FIG. 8 is a diagram showing an example of current and previous weld paths, indicating adjustments made to a nominal tool path.

FIG. 8 is an illustration in plan view of a portion of a surface of a component being clad with a series of weld lines forming adjoining cladding beads 801, 802 on the component 101 in a series of passes of a tool. In a second cladding bead 802 formed by a most recent pass of the tool, the direction of travel 804 of which is indicated, first and second edge 805a, 805b are indicated by changes in gradient of a laser line 806 scanned across the component surface 112 orthogonal to the direction of travel 804. A fitted line 807 is determined from the measurement points determined from the laser line 806, which can then be used to adjust a nominal tool path 808 based on an expected width of a subsequent cladding bead. The nominal tool path 808 is adjusted in this case by being moved to the right, resulting in an adjusted tool path 809. As the tool passes along the adjusted tool path, the cladding bead deposited should then more closely align with the edge 805b of the previously deposited bead 802.

Also shown in FIG. 8 is a further edge 810, which in this case indicates the inside edge 811 of the outer rim of the component 101. This edge defines the end of the cladding to be deposited, so is measured from a series of data points 812 to determine an edge 813 against which a final cladding bead is to be deposited.

Figure 9:
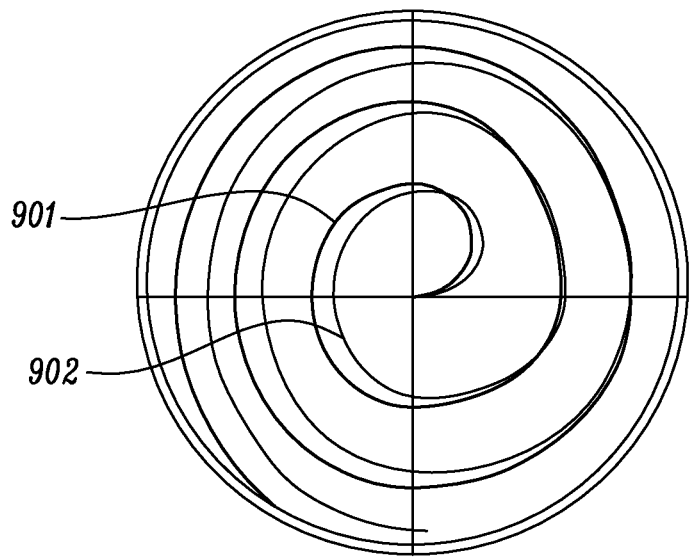
FIG. 9 is a schematic diagram illustrating how a weld tool path could change as a result of changes in geometry of a deposited weld path.

FIG. 9 illustrates schematically how a nominal tool path 901 may be adjusted to an adjusted tool path 902 as a result of measured changes in the geometry of the component being clad and changes in the cladding bead as the process is underway. The end result is that the coverage of the cladding is more uniform over the surface of the component, requiring less subsequent machining and rework.

Figure 10:
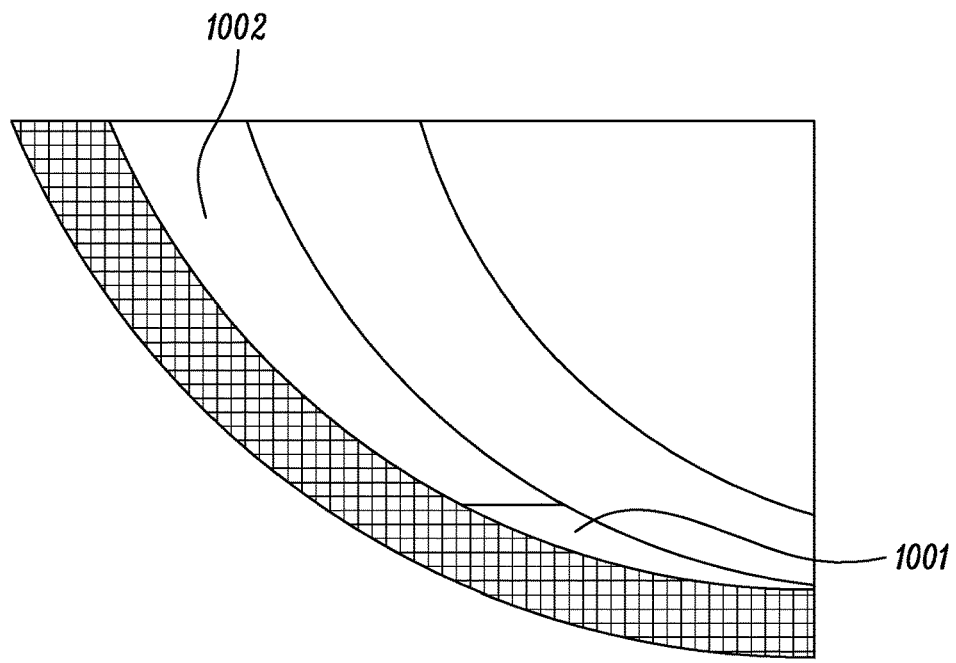
FIG. 10 is a schematic diagram of a portion of an article to be clad, in which a section to be clad is too small for a current weld path.
Figure 11:
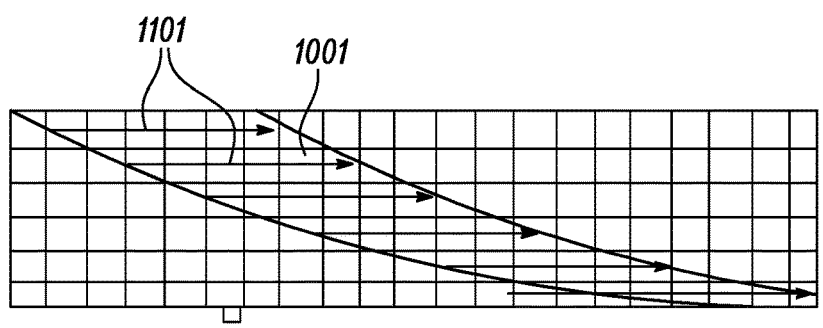
FIG. 11 is a schematic diagram of the section in FIG. 6, in which a new weld path has been determined using a different weld tool.

As the tool reaches an extremity of the surface of a component to be clad, or when a confined area is to be left clear of cladding, additional adjustments may need to be made. On such occasions an assessment may be needed to determine whether the current path can be continued with, or if continuing would result in either areas not intended for cladding to be clad or areas that have been clad being cladded again. Either of these situations would require additional work after the cladding process. An example of this is shown in FIG. 10, in which a region 1001 that cannot be clad using a current tool is left unclad because the width of the cladding bead 1002 made by the current tool is too wide. In such a situation, measurements of the component surface ahead of the cladding tool will result in the tool stopping at the point the cladding bead becomes too wide to continue with. A switch is then made for a different tool that is capable of providing a cladding bead that fits within the region 1001. FIG. 11 illustrates how the region 1001 may then be covered in cladding by making multiple parallel passes 1101 using a narrower cladding bead. To do this, the region 1001 is first scanned to determine the edges defined by previous cladding beads and the edge of the component. A series of paths is then devised to cover the region 1001 and the different tool is instructed to follow these paths 1101 and deposit the required cladding.

Figure 12:
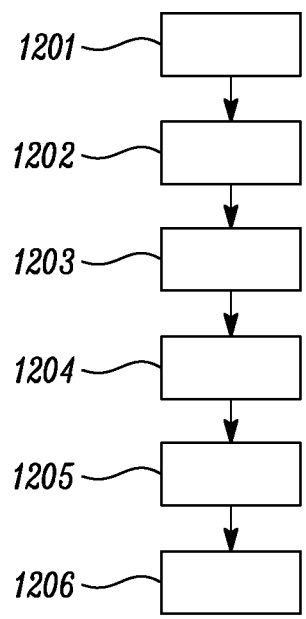
FIG. 12 is a schematic flow diagram illustrating an example method of applying cladding to a component.

FIG. 12 illustrates an example series of operations for applying a cladding layer to a component. In a first step 1201, the component is placed in a fixture. In a second step 1202, the component is scanned in the fixture, using one or more fixed reference points to create a 3-dimensional model of the component. In a third step 1203, a nominal tool path covering the surface of the component to be clad is generated based on the 3-dimensional model. Step 1203 includes sub-steps of generating a point distribution, generating tessellated segments, generating nominal tool subpaths, and generating the nominal tool path. In a fourth step 1204, the position of the tool is calibrated with reference to the component, for example using the fixed reference points (such as the touch trigger probes 105a, 105b shown in FIG. 1). The tool is then, in a fifth step 1205, moved to a starting position. In a sixth step 1206, the tool then begins depositing a weld line, forming a cladding bead on the component, following the previously determined nominal tool path. While the tool is following the nominal tool path, in step 1206 measurements are taken ahead and behind the tool and the nominal tool path is recalculated based on these measurements, for example to change the path dependent on a width of previously deposited material.

Figure 13:
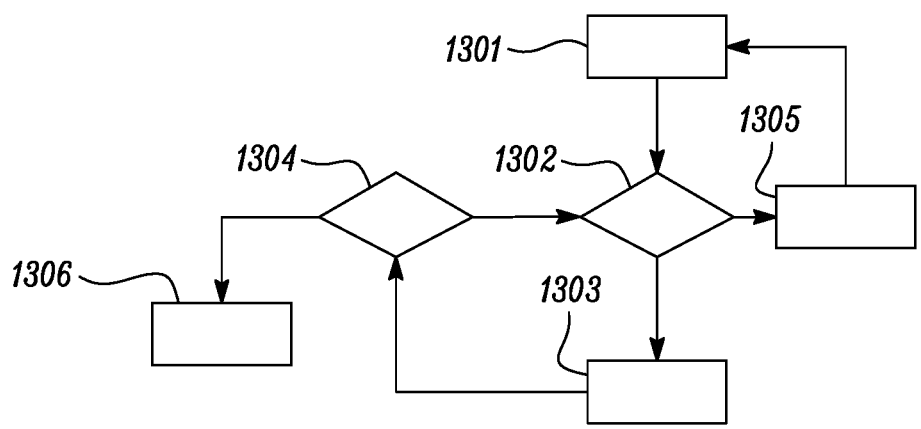
FIG. 13 is a schematic flow diagram illustrating an example method of adaptively switching a weld path.

Illustrated in FIG. 13 is a schematic flow diagram of a method of applying a cladding layer to a component, in which adjustments are made depending on whether a current cladding layer will fit within an area ahead of the tool. As the tool progresses along a nominal or adjusted tool path, a first step 1301 is to measure a width of an area ahead of the tool along the path. In step 1302, an assessment is made as to whether a width of the area is within the tolerance of the cladding width currently applied by the tool. If the answer is yes, the process continues and the weld path is continued with (step 1305). If, however, the answer is no, a change is made to a new weld path (step 1303) and another assessment made (step 1304) as to whether the new path can fit in the space available. If the answer to this is yes, the process continues to step 1302 and, provided the clad width is within the required tolerance, the process continues and the weld path is continued with (step 1305). The process may then repeat from step 1301. If, on the other hand, at step 1304 it is not possible to fit the new path in the space available, the process ends (step 1306), or alternatively a different weld path is selected. If the cladding process is at that stage incomplete, the tool may progress to another portion of the component that has not yet been clad, and the process begins again.

Other devices may alternatively, or additionally, be attached at the end of the manipulator arm. Such devices may include inspection devices such as ultrasound probes to scan over the surface of the component to look for internal defects and to measure skin thickness. Cameras and lights may be used to check the condition of the surface using dark and bright field imaging, and to inspect how clean the surface is. One or more of the above devices may also be used to identify a region needing repair or salvaging, following which a grinding or machining tool may be attached to effect a repair and to finish off the surface.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A method of applying a cladding layer to a surface of a component using a cladding tool having a maximum reach less than the size of the surface, the method comprising:
   providing a 3-dimensional model of the component, the model including geometry of the surface to be clad;
   generating a point distribution from the geometry of the surface, the point distribution including a plurality of points having a separation determined by a maximum reach of the cladding tool;
   generating a plurality of tessellated segments from the point distribution, each tessellated segment having a peripheral extent determined by a maximum reach of the cladding tool;
   generating a nominal tool subpath for each one of the plurality of tessellated segments;
   generating a nominal tool path for depositing the cladding layer on the surface of the component by combining the nominal tool subpaths;
   positioning the cladding tool adjacent the surface of the component, the tool being configured to deposit the cladding layer as a bead applied to the surface of the component;
   depositing the cladding layer on the surface of the component by instructing cladding the tool to move along the nominal tool path;
   measuring dimensions of a bead of cladding layer previously deposited by the tool;
   adjusting the nominal tool path to an adjusted tool path that accounts for dimensions of the bead to be deposited by the tool to match an edge of the bead to be deposited with an edge of a previously deposited bead; and
   continuing to deposit the cladding layer on the surface of the component by instructing the tool to move along the adjusted tool path.

2. The method of claim 1 wherein the step of measuring dimensions of a cladding layer bead previously deposited by the tool comprises scanning an area of the component over a portion of the nominal tool path behind the tool.

3. The method of claim 2 comprising scanning an area of the component over a portion of the tool path ahead of the tool.

4. The method of claim 1 wherein the cladding tool is a welding tool.

5. The method of claim 1 wherein the cladding tool is mounted to an end of a robotic manipulator arm.

6. The method of claim 5 wherein the robotic manipulator arm is mounted to a moveable gantry.

7. The method of claim 1 wherein the component is mounted to a fixture.

8. The method of claim 7 wherein the fixture is configured to move the component relative to the tool.

9. The method of claim 7 wherein the fixture comprises one or more reference points, the method comprising calibrating a position of the tool relative to the one or more reference points prior to positioning the tool adjacent the surface of the component.

10. The method of claim 1 wherein the component is dome-shaped and the cladding layer is deposited on an internal surface of the component.

11. The method of claim 1 wherein the component is a part of a pressure vessel.

12. An apparatus for applying a cladding layer to a surface of a component using a cladding tool having a maximum reach less than the size of the surface, the apparatus comprising:
   a computer storing a 3-dimensional computer model of the component, including geometry of the surface to be clad; and
   a cladding tool configured to deposit the cladding layer as a bead applied to a surface of the component,
   wherein the computer is configured to:
   generate a point distribution from the geometry of the surface, the point distribution including a plurality of points having a separation determined by a maximum reach of the cladding tool;
   generate a plurality of tessellated segments from the point distribution, each tessellated segment having a peripheral extent determined by a maximum reach of the cladding tool;
   generate a nominal tool subpath for each one of the plurality of tessellated segments;
   generate a nominal tool path for depositing the cladding layer on the surface of the component by combining the nominal tool subpaths;
   instruct the cladding tool to deposit the cladding layer on the surface of the component by instructing the tool to move along the nominal tool path while applying the cladding layer bead;
   measure dimensions of a cladding layer bead previously deposited by the tool;

adjust the nominal tool path to an adjusted tool path that accounts for dimensions of the bead to be deposited by the tool to match an edge of the bead to be deposited with an edge of a previously deposited bead; and continue to instruct the tool to deposit the cladding layer on the surface of the component by instructing the tool to move along the adjusted tool path.

13. The apparatus of claim 12 wherein the cladding tool is mounted at an end of a robotic manipulator arm.

14. The apparatus of claim 12 comprising a scanner arranged to view a portion of the surface of the component along the nominal tool path behind the tool, the computer configured to measuring dimensions of the cladding bead previously deposited by the tool using data from the scanner.

15. The apparatus of claim 14 wherein the scanner is configured to direct one or more laser scan lines across the portion of the surface of the component.

16. The apparatus of claim 12 wherein the tool is a welding tool.

17. The apparatus of claim 12 comprising a fixture configured to support the component.

18. The apparatus of claim 17 wherein the fixture comprises one or more reference points for calibrating the position of the cladding tool relative to the component.

19. The apparatus of claim 17 wherein the fixture is moveable relative to the cladding tool.

20. A non-transitory computer-readable medium having instructions encoded thereon executable by a computer that, when executed by the computer, cause the computer to perform a method of applying a cladding layer to a surface of a component using a cladding tool having a maximum reach less than the size of the surface, the method comprising:

providing a 3-dimensional model of the component, the model including geometry of the surface to be clad;

generating a point distribution from the geometry of the surface, the point distribution including a plurality of points having a separation determined by a maximum reach of the cladding tool;

generating a plurality of tessellated segments from the point distribution, each tessellated segment having a peripheral extent determined by a maximum reach of the cladding tool;

generating a nominal tool subpath for each one of the plurality of tessellated segments;

generating a nominal tool path for depositing the cladding layer on the surface of the component by combining the nominal tool subpaths;

positioning a the cladding tool adjacent a the surface of the component, the tool being configured to deposit the cladding layer as a bead applied to the surface of the component;

depositing the cladding layer on the surface of the component by instructing cladding the tool to move along the nominal tool path;

measuring dimensions of a bead of cladding layer previously deposited by the tool;

adjusting the nominal tool path to an adjusted tool path that accounts for dimensions of the bead to be deposited by the tool to match an edge of the bead to be deposited with an edge of a previously deposited bead; and continuing to deposit the cladding layer on the surface of the component by instructing the tool to move along the adjusted tool path.

\* \* \* \* \*